(12) United States Patent
Amano et al.

(10) Patent No.: US 10,800,431 B2
(45) Date of Patent: Oct. 13, 2020

(54) VEHICLE

(71) Applicant: Toyota Jidosha Kabushiki Kaisha, Toyota-shi, Aichi-ken (JP)

(72) Inventors: Megumi Amano, Toyota (JP); Kohei Maejima, Nagakute (JP); Chika Kajikawa, Toyota (JP); Hikaru Gotoh, Nagoya (JP); Yoshiaki Matsumura, Toyota (JP); Chiharu Hayashi, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/225,579

(22) Filed: Dec. 19, 2018

(65) Prior Publication Data

US 2019/0193752 A1    Jun. 27, 2019

(30) Foreign Application Priority Data

Dec. 27, 2017  (JP) ................................ 2017-252267

(51) Int. Cl.
*B60W 50/14*    (2020.01)
*G05D 1/00*    (2006.01)

(52) U.S. Cl.
CPC ........... *B60W 50/14* (2013.01); *G05D 1/0061* (2013.01); *B60W 2050/146* (2013.01)

(58) Field of Classification Search
CPC ............................ B60W 50/14; G05D 1/0061
See application file for complete search history.

(56) References Cited

U.S. PATENT DOCUMENTS

| | | | |
|---|---|---|---|
| 9,827,811 B1* | 11/2017 | McNew | B60N 2/90 |
| 2009/0319095 A1* | 12/2009 | Cech | B60K 35/00 |
| | | | 701/1 |
| 2010/0157061 A1* | 6/2010 | Katsman | G07C 5/008 |
| | | | 348/149 |
| 2013/0169792 A1* | 7/2013 | Mathes | B62D 15/027 |
| | | | 348/119 |
| 2017/0329329 A1* | 11/2017 | Kamhi | B60W 50/14 |
| 2019/0049965 A1* | 2/2019 | Tanriover | G08G 1/01 |

FOREIGN PATENT DOCUMENTS

| | | |
|---|---|---|
| JP | 2012126193 A | 7/2012 |
| JP | 2016196228 A | 11/2016 |

* cited by examiner

*Primary Examiner* — Quan-Zhen Wang
*Assistant Examiner* — Mancil Littlejohn, Jr.
(74) *Attorney, Agent, or Firm* — Dinsmore & Shohl LLP

(57) ABSTRACT

Provided is a vehicle including (i) a vehicle main body configured to be operated by an autonomous driving operation, at least a part of the autonomous driving operation being able to be substituted by a manual driving operation, and (ii) an advice information presentation unit that is disposed inside the vehicle main body and presents advice information, relating to advice about the manual driving operation, to an occupant.

12 Claims, 10 Drawing Sheets

VEHICLE

CROSS-REFERENCE TO RELATED APPLICATION

This application claims priority under 35 USC 119 from Japanese Patent Application No. 2017-252267 filed on Dec. 27, 2017, the disclosure of which is incorporated by reference herein in its entirety.

TECHNICAL FIELD

The present disclosure relates to a vehicle,

RELATED ART

Japanese Patent Application Laid-Open (JP-A) No. 2016-196228 discloses a display system which allows a driver to quickly grasp the surrounding traffic situation by setting the display position at a first position blocking the front view during a period of autonomous driving of an automobile, and switching the display position to a second position, not blocking the front view when manual driving is initiated.

In a vehicle whose driving operations can be partially or entirely performed in an autonomous manner, it is concerned that the driving skills of a vehicle occupant may be reduced due to the absence of manual driving (or a reduced frequency of manual driving).

SUMMARY

The present disclosure makes operations of manual driving easier in a vehicle having a function of autonomous driving operation.

In a first aspect, a vehicle includes (i) a vehicle main body configured to be operated by an autonomous driving operation, at least a part of the autonomous driving operation being able to be substituted by a manual driving operation, and (ii) an advice information presentation unit that is disposed inside the vehicle main body and presents advice information, relating to advice about the manual driving operation, to an occupant.

In the vehicle according to the first aspect, the advice information presentation unit presents the advice information on the manual driving operation to the occupant of the vehicle. The occupant can easily perform the manual driving operation by receiving the advice information. The advice information may be presented in a state of autonomous driving operation, e.g., in a state where the occupant is not performing the manual driving operation at all. Even in a state of autonomous driving operation, the advice information is useful for the occupant as a guide for the manual driving operation.

In a second aspect, the advice information presentation unit according to the first aspect presents the advice information to the occupant in a state in which the occupant is performing a part or the entirety of the manual driving operation.

The advice information presentation unit presents the advice information on the manual driving operation to the occupant of the vehicle in a state where the occupant is performing a part or the entirety of the autonomous driving operation by the manual driving operation. In other words, the occupant can easily perform the manual driving operation in a state of actually performing the manual driving operation.

In a third aspect, the advice information presentation unit according to the second aspect presents the advice information to the occupant in a case in which the occupant parks the vehicle by the manual driving operation.

When the occupant parks the vehicle as the manual driving operation, the advice information presentation unit presents the advice information on the driving operation for parking to the occupant of the vehicle. This enables the occupant to easily perform the parking.

In a fourth aspect, the advice information presentation unit according to any one of the first to the third aspects presents a direction and an action, for which the occupant should exercise caution during the manual driving operation, to the occupant as the advice information.

By the advice information presentation unit, the direction and action for which the occupant should exercise caution during the manual driving operation are presented to the occupant as the advice information. In other words, the advice can be presented to the occupant in a concrete manner. The advice may include information other than the direction and action for which the occupant should exercise caution.

A fifth aspect of the present disclosure is a method for presenting advice information to an occupant of a vehicle, which has a vehicle main body configured to be operated by an autonomous driving operation, at least a part of the autonomous driving operation being able to be substituted by a manual driving operation, the method including presenting the advice information, relating to advice about the manual driving operation, via at least one of an image display unit or a speaker disposed inside the vehicle main body, to the occupant.

A sixth aspect of the present disclosure is a non-transitory computer readable medium storing a program that causes a computer to execute a process for presenting advice information to an occupant of a vehicle, which has a vehicle main body configured to be operated by an autonomous driving operation, at least a part of the autonomous driving operation being able to be substituted by the manual driving operation, the process including, presenting the advice information, relating to advice about the manual driving operation, via at least one of an image display unit or a speaker disposed inside the vehicle main body, to the occupant.

According to the present disclosure, operations of manual driving can be made easier in a vehicle having a function of an autonomous driving operation.

BRIEF DESCRIPTION OF THE DRAWINGS

Exemplary embodiments of the present disclosure will be described in detail based on the following figures, wherein.

DETAILED DESCRIPTION

A vehicle 102 according to the first embodiment of the present disclosure will now be described in detail referring to the figures. The simple terms "front side" and "rear side" used herein mean the front side and the rear side along the vehicle anteroposterior direction, respectively, and the terms "upper side" and "lower side" mean the upper side and the lower side along the vehicle vertical direction, respectively.

The vehicle 102 of this embodiment has a function of an "autonomous driving operation" that is capable of automatically perform a part or the entirety of driving operations. The term "driving operations" used herein substantially include operations for driving the vehicle 102 on a road and parking the vehicle 102 at a prescribed parking spot in a parking area or the like. It is noted here, however, that simple functions of automatically performing transmission gear-shifting operations (automatic transmission) and automatically maintaining a constant vehicle speed (cruise control) do not themselves correspond to the "driving operations", in other words, the "driving operations" are operations for appropriately driving (including stopping) the vehicle 102 by controlling the vehicle 102 at a prescribed speed and a prescribed position, which operations include the above-described gear-shifting and vehicle speed-maintaining operations.

Figure 7:
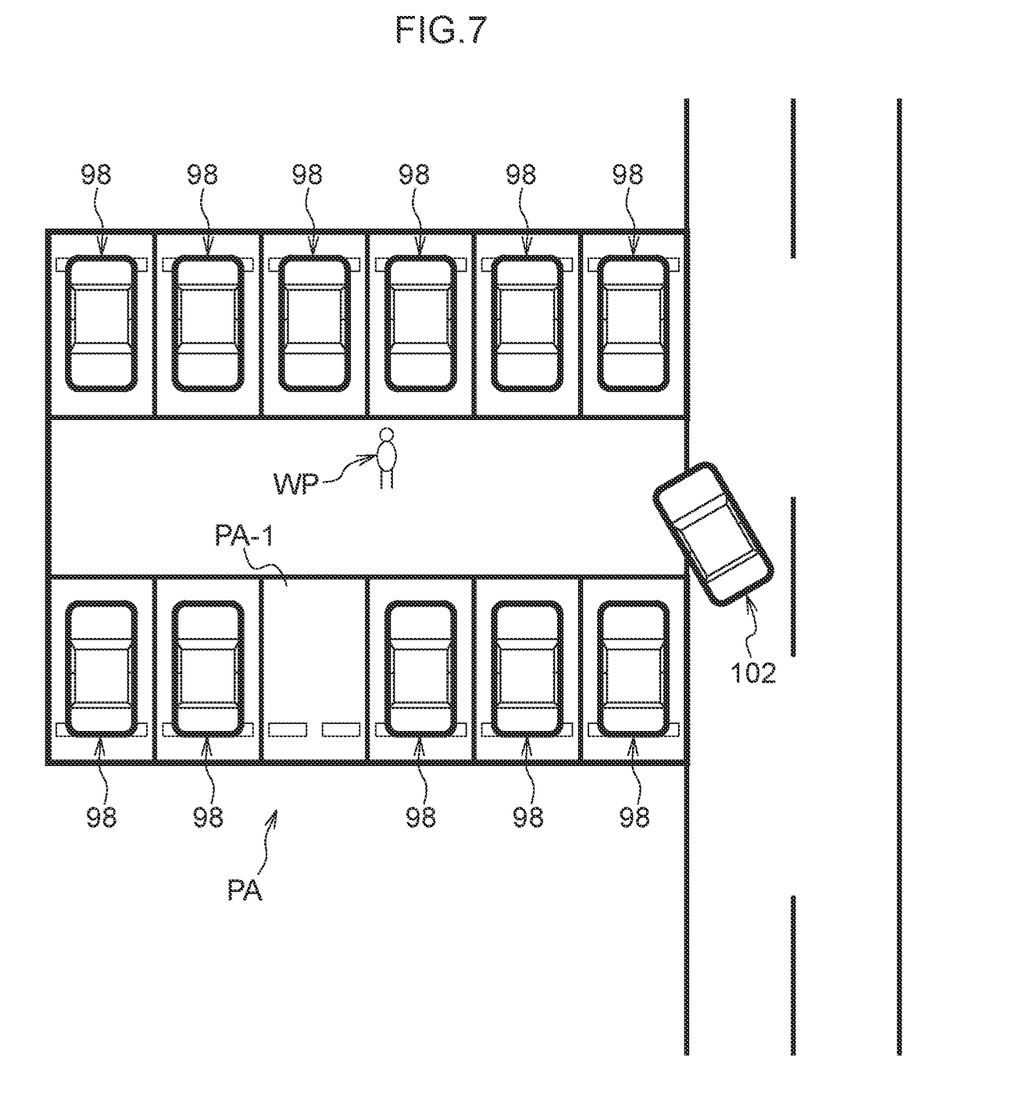
FIG. 7 is a plan view that illustrates a situation of parking the vehicle of the first embodiment in a parking area.
Figure 8:
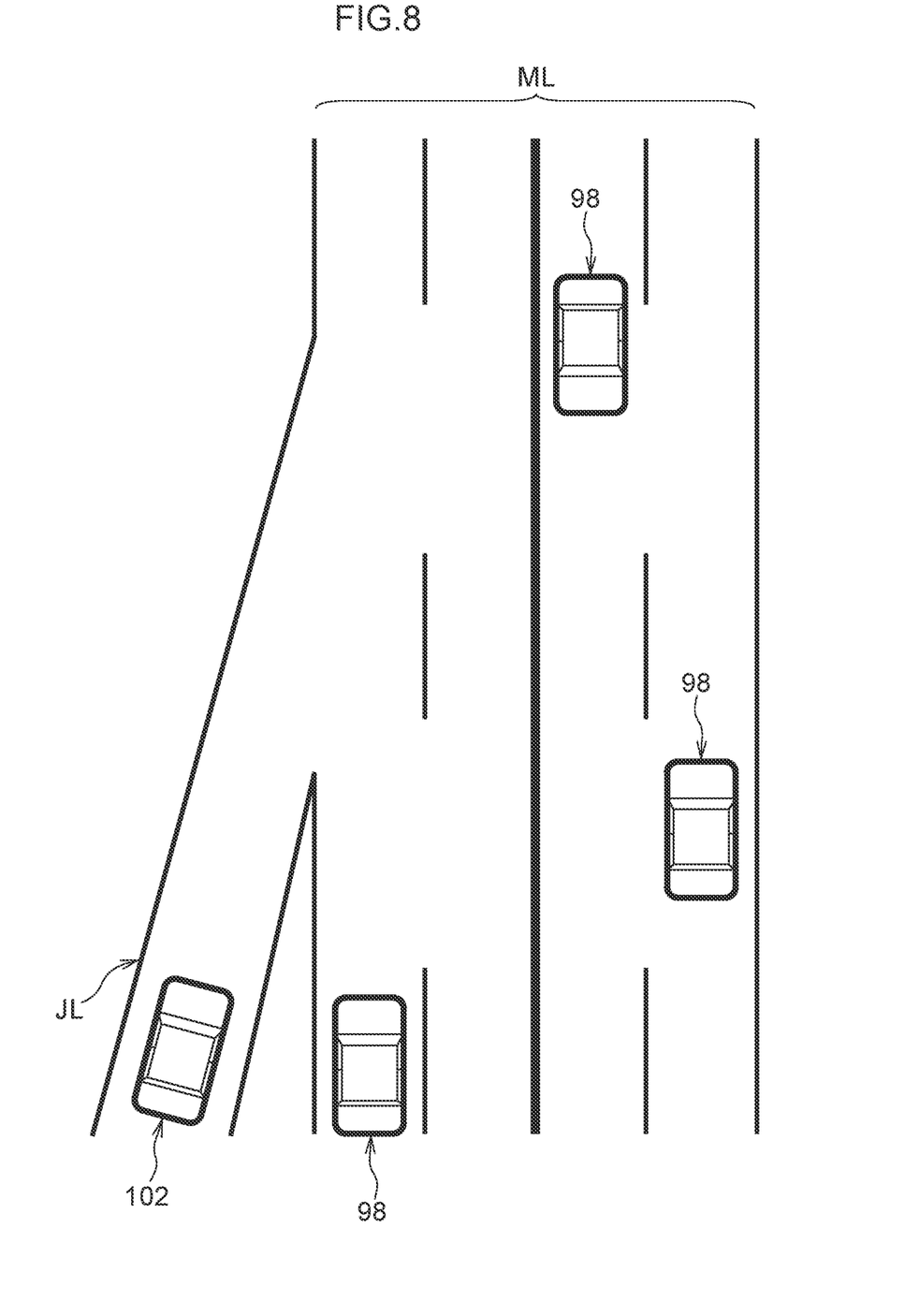
FIG. 8 is a plan view that illustrates a situation of driving the vehicle of the first embodiment from a merging lane into a main lane of a road.
Figure 9:
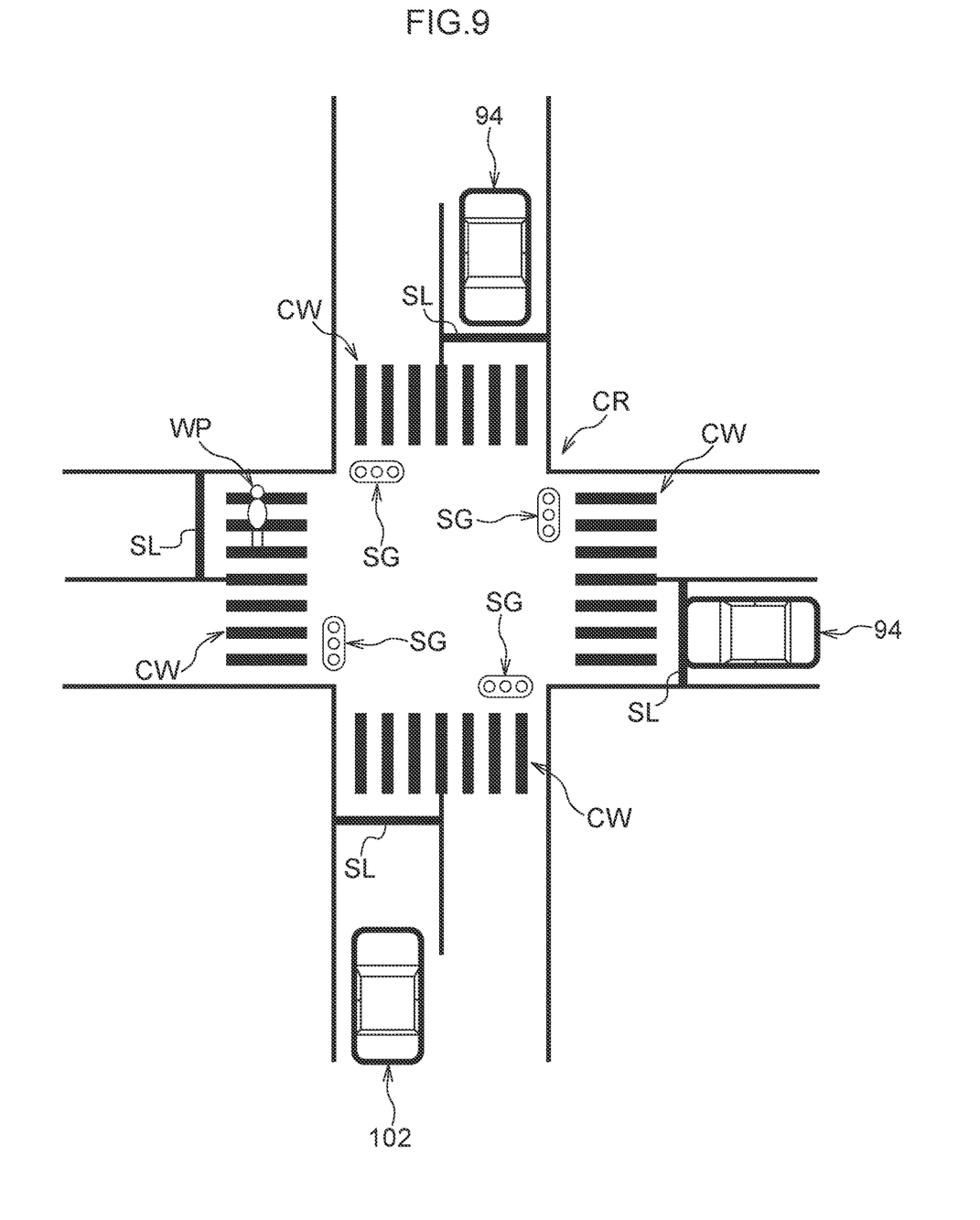
FIG. 9 is a plan view that illustrates a situation of driving the vehicle of the first embodiment into a crossroads.

Further, in the vehicle 102 of this embodiment, a part or the entirety of the autonomous driving operation can be switched to a manual driving operation. For example, the operations during driving on a road (a series of operations including steering, acceleration, braking and operations of other various instruments) can be performed as the manual driving operation. Further, the driving operations for, for example, parking the vehicle 102 at a prescribed parking spot in a parking area PA as illustrated in FIG. 7, driving the vehicle 102 to merge into a main lane ML of a road as illustrated in FIG. 8 or driving the vehicle 102 into a crossroads CR as illustrated in FIG. 9 can be performed as the manual driving operation.

Figure 1:
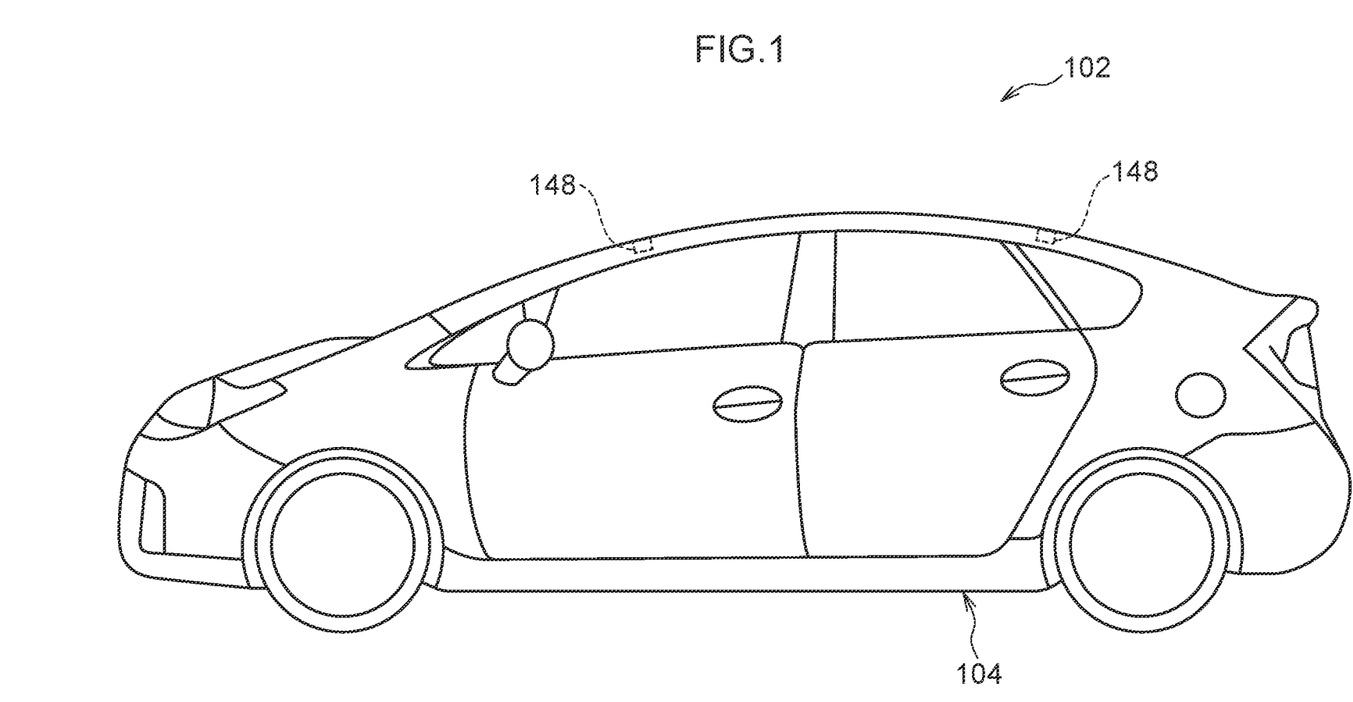
FIG. 1 is a side view illustrating a vehicle of a first embodiment.
Figure 2:
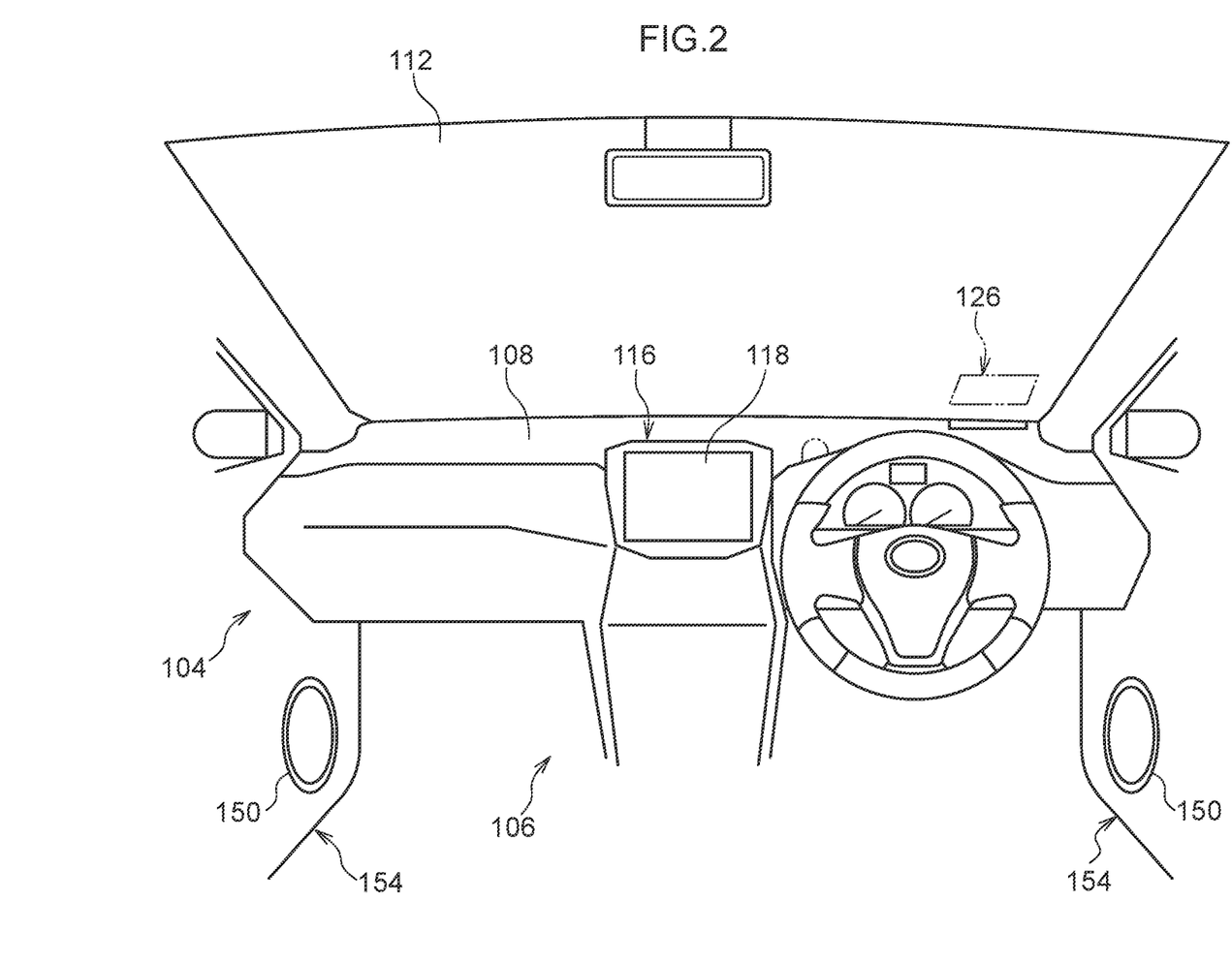
FIG. 2 is a view taken from the inside of the compartment toward the front in the vehicle of the first embodiment.

As illustrated in FIGS. 1 and 2, the vehicle 102 includes a vehicle main body 104, inside of which is a vehicle compartment 106. A dashboard 108 is arranged on the front side of the vehicle compartment 106, and a windshield 112 is arranged above the dashboard 108.

A display panel 116 is arranged on the dashboard 108. In this embodiment, the display panel 116 is arranged at a central position in the vehicle widthwise direction on the dashboard 108.

The display panel 116 doubles as an input device 118 and also functions as an input panel which receives an input made by an occupant's touch operation. As the input device 118, an input display (e.g., a touch panel) or various input switches (e.g., push buttons and slide switches) may be arranged separately from the display panel 116. Further, for example, a microphone which receives a voice input from an occupant, or a sensor which detects a motion of an occupant (movement of an arm or a fingertip) can also be used as the input device 118. For example, by inputting the place where the vehicle main body 104 is heading to (occupant's destination) using the input device 118 to display information on a route to the destination on the display panel 116, the display panel 116 is allowed to function as a part of a car navigation system. The information on the route to the destination may be presented by a device other than the display panel 116, for example, by voice from speakers 150. The display panel 116 is one example of the advice information presentation unit of the present disclosure.

Figure 3:
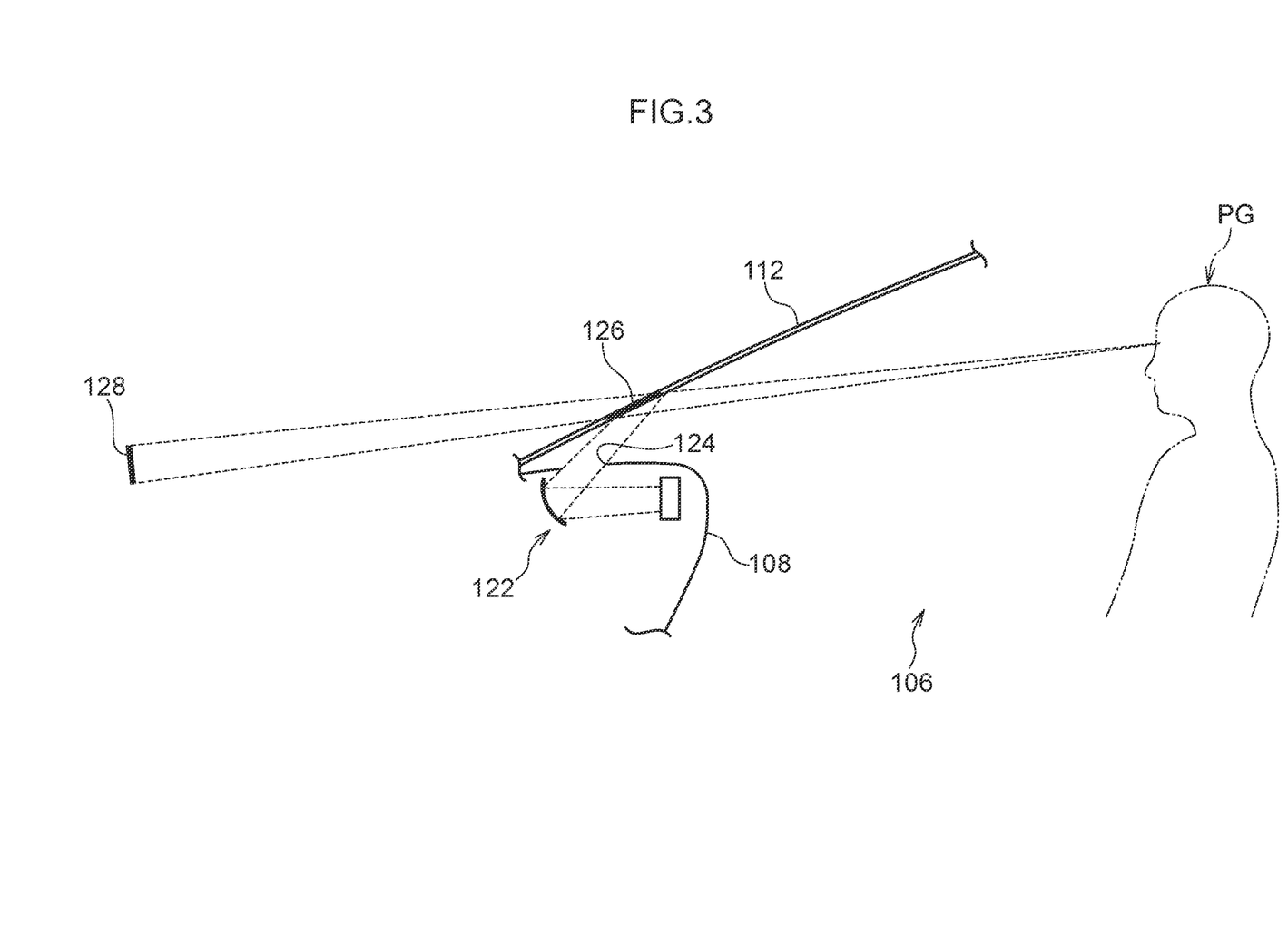
FIG. 3 is a drawing that illustrates the position of the windshield in the vehicle of the first embodiment.

As illustrated in FIG. 3, a projection member 122 is arranged inside the dashboard 108. The projection member 122 is one example of the advice information presentation unit of the present disclosure.

The projection member 122 projects a projected image 126 at a prescribed position on the windshield 112 through a projection window 124 of the dashboard 108. This projected image 126 is projected in such a manner to form a virtual image 128 further on the front side than the windshield 112 when viewed from an occupant PG. The occupant PG can visually recognize the projected image 126 in a superimposed manner with the sight outside the vehicle created by the light transmitting through the windshield 112. In other words, the projection member 122 of this embodiment is a head-up display. Further, the speakers 150 are arranged inside the vehicle compartment 106 (on doors 154 in the example illustrated in FIG. 2). The speakers 150 are one example of the advice information presentation unit of the present disclosure.

Figure 4:
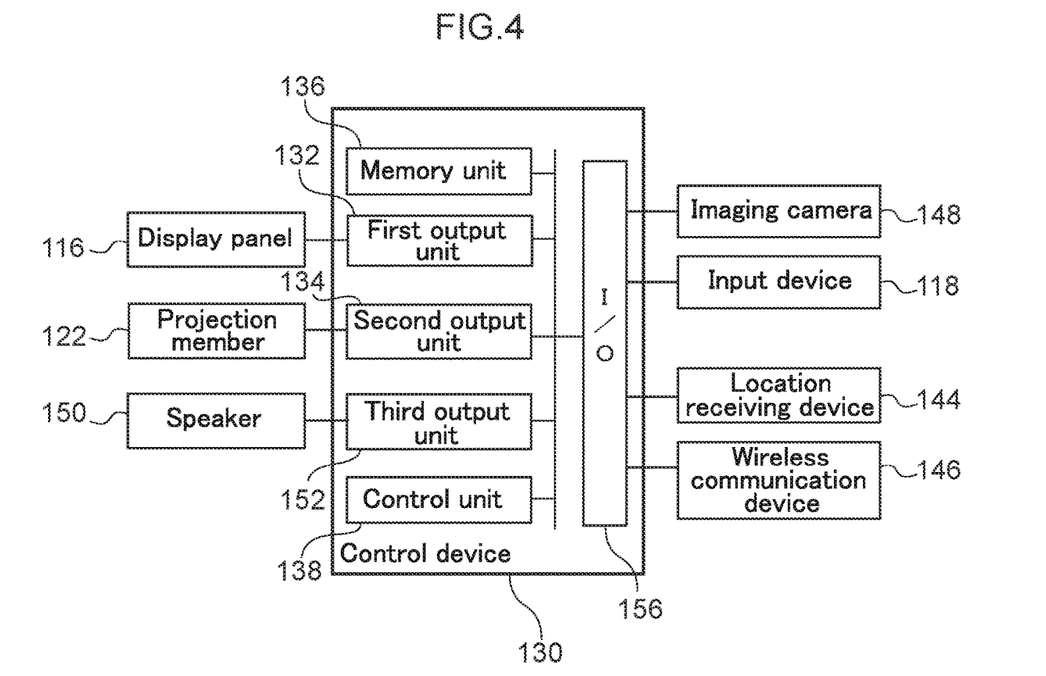
FIG. 4 is a block diagram of the vehicle of the first embodiment.

As illustrated in FIG. 4, a control device 130 is connected to the display panel 116, the projection member 122 and the speakers 150. The control device 130 includes a first output unit 132, a second output unit 134 and a third output unit 152. The first output unit 132 and the second output unit 134 each output a prescribed image to the display panel 116 and the projection member 122, respectively. The third output unit 152 outputs a prescribed voice to the speakers 150.

The control device 130 also includes a memory unit 136 and a control unit 138. In the memory unit 136, for example, a driving advice information presentation program for executing the below-described "driving advice information presentation process" has been stored in advance. Further, the input device 118 is connected to the control device 130, and it is configured such that information inputted to the input device 118 is transmitted to the control device 130.

Figure 10:
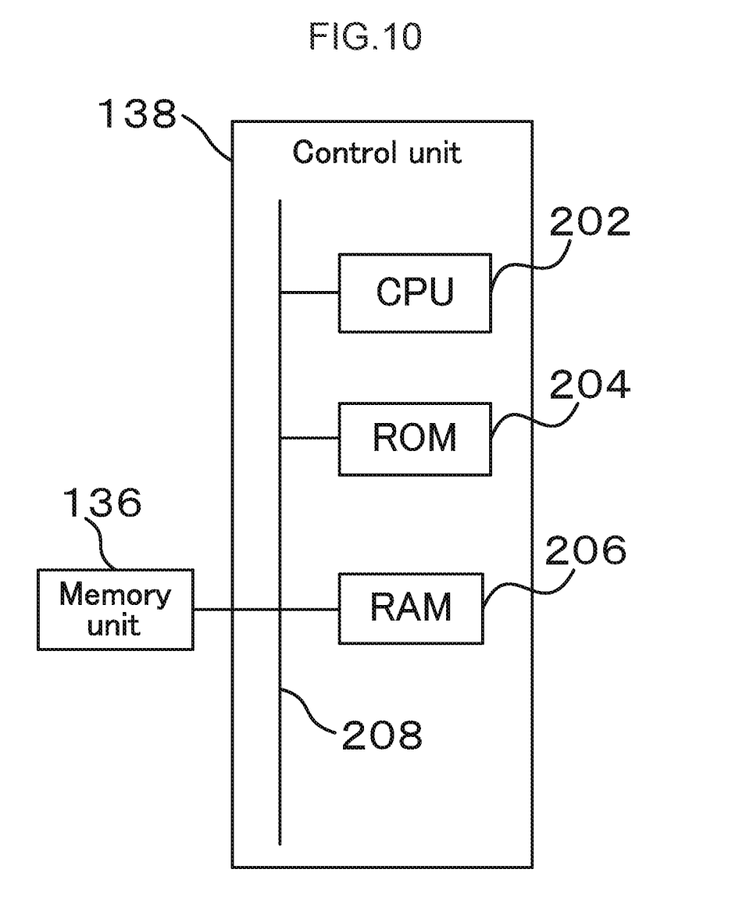
FIG. 10 is a block diagram illustrating a hardware configuration of a control unit of a control device.

FIG. 10 shows a block diagram of a hardware configuration of the control unit 138. The control unit 138 includes a Central Processing Unit (CPU) 202, a Read Only Memory (ROM) 204, and a Random Access Memory (RAM) 206. The control unit 138 is connected to the memory unit 136. These components are connected in a mutual communication manner via a bus 208.

The CPU 202 is formed as a central processing unit so as to execute various programs and to control each portion. That is, the CPU 202 reads a program from the ROM 204 or the memory unit 136 and executes the program using the RAM 206 as a working area. The CPU 202 performs the control of each unit included in the vehicle main body 104 and various calculations in accordance with the program stored in the ROM 204 or the memory unit 136.

The ROM 204 stores various programs and various data. Note that programs and data, or portions thereof which are described to be stored in the memory unit 136 throughout the present disclosure, can be stored at the ROM 204 instead of the memory unit 136. The RAM 206 stores the programs or the data temporarily as a working area.

For convenience of explanation, hereinafter, performing various functions of the vehicle main body 104 by the ROM 204 of the control unit 138 executing the driving advice information presentation program stored in the memory unit 136 is described as that the control unit 138 controls the vehicle main body 104.

To an I/O (Input/Output) port 156 of the control device 130, in addition to the input device 118, a location receiving device 144, an imaging camera 148 and a wireless communication device 146 are also connected. The control unit 138, in accordance with the various information inputted to the control device 130, processes image information to be outputted from each of the first output unit 132 and the second output unit 134 to the display panel 116 and the projection member 122 and, at the same time, also processes voice information to be outputted from the third output unit 152 to the speakers 150.

The location receiving device 144 receives current location information of the vehicle 102 from, for example, a global positioning system (GPS). The wireless communication device 146, for example, wirelessly communicates with an external server via an internet connection or the like to transmit and receive information.

In the vehicle 102 of this embodiment, as described above, an autonomous driving operation can be performed. The control device 130 is capable of not only acquiring various information relating to the conditions of the vehicle 102 from various sensors for performing the autonomous driving operation, but also controlling the drive (actions) of various driving devices.

As illustrated in FIG. 1, the imaging camera 148 is attached to the vehicle main body 104. In this embodiment, as one example, a camera capable of capturing the surrounding situation of the vehicle main body 104 as video is used. A single imaging camera 148 may be used such that an image of a specific direction can be captured, or plural imaging cameras 148 may be used such that the situation of the entire perimeter of the vehicle main body 104 can he captured.

The imaging camera 148 transmits an image of the surroundings of the vehicle main body 104 to the control device 130. Examples of the imaging device include a camera that takes images using visible light, Next, a method of executing a "driving advice information presentation process" for the occupant PG in the vehicle 102 of this embodiment will be described. In the vehicle 102 of this embodiment, the control unit 138 of the control device 130 reads out a prescribed program stored in the memory unit 136 and, in accordance with the flow illustrated in FIG. 5, executes the "driving advice information presentation process" for displaying a prescribed display content using the display panel 116 and the projection member 122 and for generating voice from the speaker 150.

Figure 5:
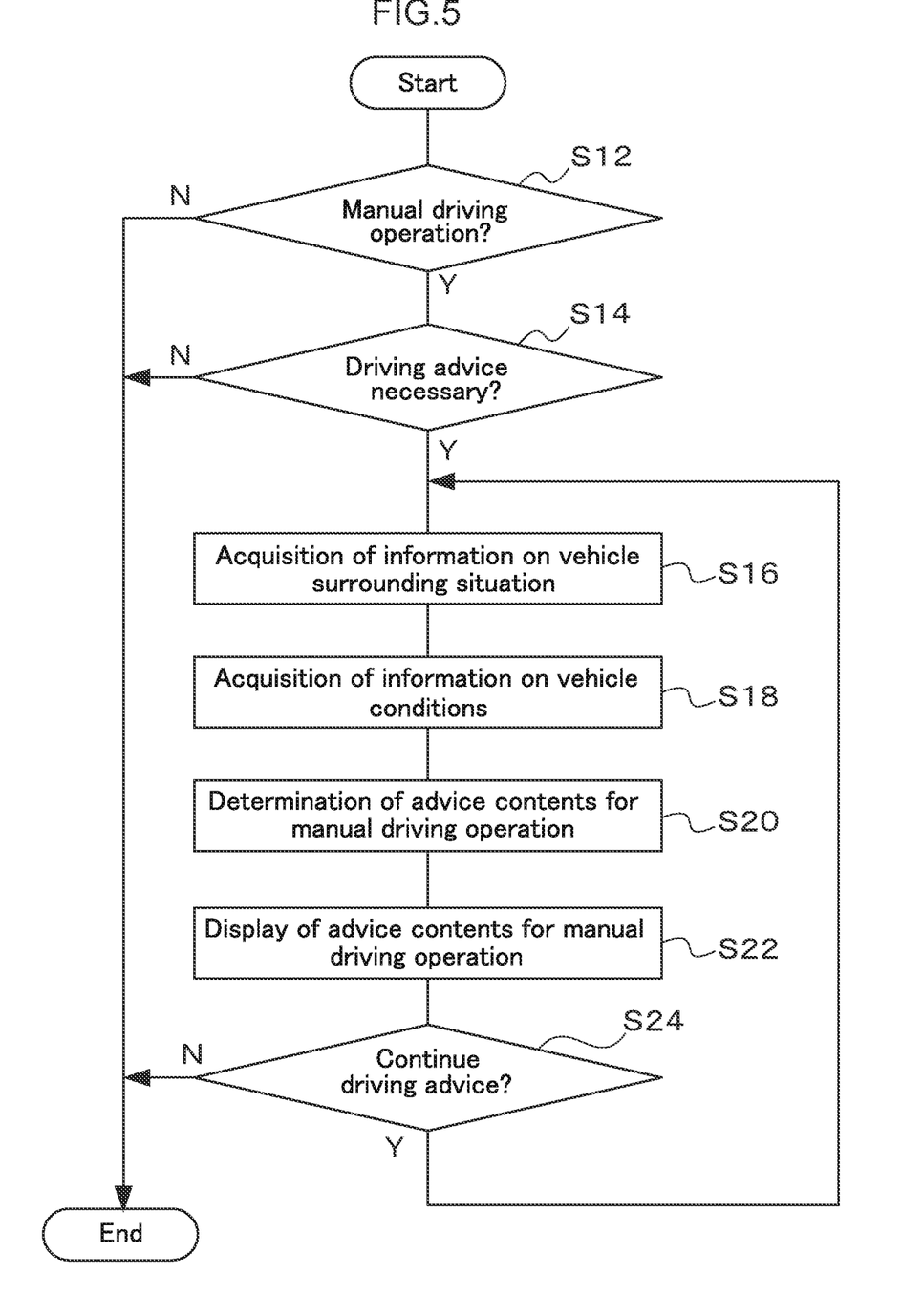
FIG. 5 is a flow chart of a driving advice information presentation process in the vehicle of the first embodiment.

In the execution of this "driving advice information presentation process", in the step S12, the control device 130 first judges whether or not the vehicle 102 is under manual driving operation. Then, when the vehicle 102 is not under a manual driving operation (when die vehicle 102 is under an autonomous driving operation), this process is terminated.

Figure 6:
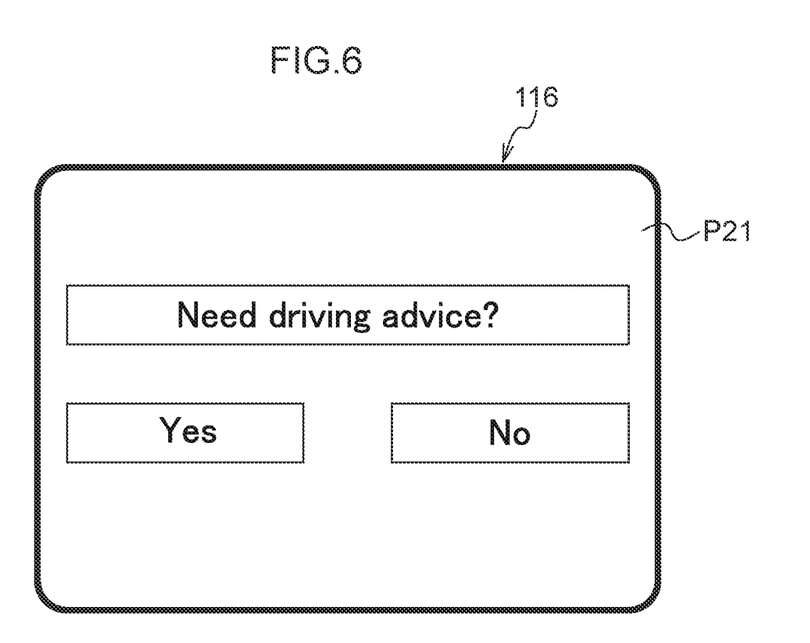
FIG. 6 is a drawing that illustrates one example of an image displayed on a display panel in the vehicle of the first embodiment.

Meanwhile, when the vehicle 102 is judged to be under a manual driving operation in the step S12, the process proceeds to the step S14. In the step S14, the control device 130 judges whether or not the occupant PG needs driving advice. For this judgment, the control device 130 displays, for example, a screen display P21 illustrated in FIG. 6 on the display panel 116. The screen display P21 illustrated in FIG. 6 may be displayed, for example, at the start of driving the vehicle 102, or after a prescribed screen calling operation made by the occupant PG. Further, a configuration in which, when the occupant PG speaks "initiate driving advice" or the like, the control device 130 can recognize the voice inputted via a microphone (not illustrated) and judge that the occupant PG wishes to receive driving advice may he adopted as well.

When it is judged that an input for not receiving driving advice has been made, the "driving advice information presentation process" is not executed and terminated. In other words, the "driving advice information presentation process" is executed when it is judged that an input for receiving driving advice has been made.

Next, in the step S16, the control device 130 acquires information relating to the surrounding situation of the vehicle 102 from, for example, information on the current location of the vehicle and the results of image capturing performed by the imaging camera 148. Examples of the "surrounding situation" include the presence of other vehicles and obstacles around the vehicle 102 and the presence of an intersection, a merging point, a traffic signal, a crosswalk, a railroad crossing and the like, as well as traffic regulations. Further, in the step S18, the control device 130 acquires various information relating to the conditions of the vehicle 102. Examples thereof include the speed of the vehicle 102, the gear position of the transmission, the degree of throttle opening, and the angle of the steering wheel.

These processes of the steps S16 and S18 can be executed in the same manner as the processes executed for the autonomous driving function of the vehicle 102.

Then, in the step S20, the control device 130 determines the contents of the advice information for the manual driving operation.

Further, in the step S22, the control device 130 presents the contents of the advice information using the display panel 116, the projection member 122, the speakers 150 and the like.

A concrete method of presenting the advice information is not restricted. For example, on the display panel 116, the surrounding situation of the vehicle 102 captured by the imaging camera 148 is displayed as an image. The projection member 122 projects an image that contains the directions and actions for which caution must be exercised during the manual driving operation as well as the operation contents in characters and symbols (e.g., arrows). Further, for example, a method of presenting the operation contents by voice from the speakers 150 may be employed as well. These presentation methods can be used singly, or in combination of two or more thereof. Particularly, the advice information on the manual driving operation can be concretely presented by indicating the directions and actions for which the occupant PG must exercise caution.

For example, in the case of parking the vehicle 102 in a desired parking space PA-1 of a parking area PA as illustrated in FIG. 7, the contents of the advice information to be presented include advice information and the like on the gear-shifting between forward and reverse drive and the angle of the steering wheel. When there is other vehicle 98 and/or a pedestrian WP in the parking area PA, the advice information also includes cautions for them.

In the case of driving the vehicle 102 from a merging lane JL into a main lane ML of a road as illustrated in FIG. 8, the advice information includes advice on the adjustment of the vehicle speed based on the degree of throttle opening (stepping on the accelerator pedal) and the braking operation, as well as the angle of the steering wheel, the blinker operation and the like. In this case as well, for example, when there is a vehicle 98 and/or an obstacle near the vehicle 102, the advice information also includes cautions for them.

Moreover, in the case of driving the vehicle 102 into a crossroads CR as illustrated in FIG. 9, the advice information includes advice on the adjustment of the vehicle speed and stopping position based on the degree of throttle opening (stepping on the accelerator pedal) and the braking operation, as well as the blinker operation and the like. In this case as well, the advice information also includes cautions to, for example, check the positions of crosswalks CW and stop lines SL, other vehicles 94 entering the crossroads CR, the pedestrian WP on the crosswalks CW, and traffic signals SG.

In the step S24, the control device 130 judges whether or not to continue to present the advice information. For example, the control device 130 awaits the occupant PG to speak "driving advice not necessary" or the like for a prescribed period (about 1 second). Alternatively, the control device 130 may display a selection screen asking whether or not to terminate the driving advice on the display panel 116 and wait for an input to be made to the display panel 116.

When a voice of "driving advice not necessary" is not recognized within the prescribed period, it is judged that the occupant PG wishes to continue to receive the driving advice, and the process returns back to the step S16. On the other hand, when a voice of "driving advice not necessary" is recognized within the prescribed period, the "driving advice information presentation process" is terminated.

In the above-described manner, in this embodiment, since the driving advice information is presented in a state where the vehicle 102 is under a manual driving operation, an occupant PG particularly the driver, can appropriately perform the manual driving operation in accordance with the driving advice information. For example, when the occupant who usually drives the vehicle 102 using the automatic driving function performs a manual driving operation so as to inhibit a reduction in his/her driving, skills, the occupant can consult the advice information about the driving operations, and this can contribute to certain prevention of a reduction in the driving skills.

In the above, a configuration in which the "driving advice information presentation process" is executed when the vehicle 102 is under a manual driving operation was described as an example; however, a configuration in which the "driving advice information presentation process" is executed when the vehicle 102 is under an autonomous driving operation may he adopted as well. In other words, with the driving advice information being presented when the vehicle 102 is under an autonomous driving operation, the occupant can obtain a knowledge of the driving operations appropriate for the driving situation by taking the presented driving advice information as a guide (reference) for the driving operations.

In the above, the display panel 116, the projection member 122 and the speakers 150 that are arranged on the vehicle main body 104 were exemplified as the advice information presentation unit. The advice information presentation unit is, however, not restricted to such members arranged on the vehicle main body 104, and a member or an instrument that exists inside the vehicle main body 104 can also be used as the advice information presentation unit. For example, the advice information may be transmitted from the control device 130 to an information terminal (e,g., a cellular phone, a smartphone, a tablet computer, or a laptop computer) carried by the occupant PG, and the advice information may be presented on the information terminal.

Further, the driving advice information presentation process performed by the CPU 202 reading the program in the embodiment described above may be performed various processors other than a CPU. In this case, an example of the processor includes a Programmable Logic Device (PLD), the circuit configuration of which can be changed after manufacturing the device, such as a Field-Programmable Gate Array (FPGA), and a specific electric circuit formed as a processor having a circuit configuration specifically designed for performing specific processing such as an Application Specific Integrated Circuit (ASIC). Further, the location-related information display processing may be performed by one of the various processors, or a combination of two or more of similar processors, or different processors (for example, a combination of a plurality of the FPGAs, a combination of the CPU and the FPGA, or the like). Further, a hardware configuration of the various processors is specifically formed as an electric circuit combining circuit elements such as semiconductor element.

Further, in the embodiments described above, the location-related, information display program is stored in the memory unit 136 or the ROM 204, however it is not limited to this. The program may be provided by a storage medium such as a Compact Disk Read Only Memory (CD-ROM), a Digital Versatile Disk Read Only Memory (DVD-ROM), and a Universal Serial Bus (USB) memory in which the program is stored. Further, the program may be downloaded from an external device through a network.

What is claimed is:

1. A vehicle comprising:
   a vehicle main body configured to be operated by an autonomous driving operation, at least a part of the autonomous driving operation being able to be substituted by a manual driving operation;
   an advice information presentation unit that is disposed inside the vehicle main body and presents advice information, relating to advice about the manual driving operation, to an occupant; and
   a control device configured to:
   (i) judge whether the vehicle is operated by the manual driving operation or the autonomous driving operation;
   (ii) judge whether the advice information is needed; and
   (iii) present the advice information with the advice information presentation unit in response to judging that the vehicle is operated by the manual driving operation and judging that the advice information is needed,
   wherein the advice information is not presented with the advice information presentation unit in response to judging that the vehicle is operated by the autonomous driving operation or judging that the advice information is not needed.

2. The vehicle according to claim 1, wherein the advice information presentation unit presents the advice information to the occupant in a state in which the occupant is performing a part or the entirety of the manual driving operation.

3. The vehicle according to claim 2, wherein the advice information presentation unit presents the advice information to the occupant in a case in which the occupant parks the vehicle by the manual driving operation.

4. The vehicle according to claim 1, wherein the advice information presentation unit presents a direction and an action, for which the occupant should exercise caution during the manual driving operation, to the occupant as the advice information.

5. A method for presenting advice information to an occupant of a vehicle, which has a vehicle main body configured to be operated by an autonomous driving operation, at least a part of the autonomous driving operation being able to be substituted by a manual driving operation, the method comprising:
- (i) judging whether the vehicle is operated by the manual driving operation or the autonomous driving operation;
- (ii) judging whether the advice information is needed; and
- (iii) presenting the advice information, relating to advice about the manual driving operation, via at least one of an image display unit or a speaker disposed inside the vehicle main body, to the occupant in response to judging that the vehicle is operated by the manual driving operation and judging that the advice information is needed, wherein the advice information is not presented in response to judging that the vehicle is operated by the autonomous driving operation or judging that the advice information is not needed.

6. A non-transitory computer readable medium storing a program that causes a computer to execute a process for presenting advice information to an occupant of a vehicle, which has a vehicle main body configured to be operated by an autonomous driving operation, at least a part of the autonomous driving operation being able to be substituted by a manual driving operation, the process comprising:
- (i) judging whether the vehicle is operated by the manual driving operation or the autonomous driving operation;
- (ii) judging whether the advice information is needed; and
- (iii) presenting the advice information, relating to advice about the manual driving operation, via at least one of an image display unit or a speaker disposed inside the vehicle main body, to the occupant in response to judging that the vehicle is operated by the manual driving operation and judging that the advice information is needed, wherein the advice information is not presented in response to judging that the vehicle is operated by the autonomous driving operation or judging that the advice information is not needed.

7. The vehicle according to claim 3, wherein the advice information presentation unit presents the advice information including at least one of information related to gear-shifting or steering wheel angle.

8. The vehicle according to claim 1, wherein the advice information presentation unit presents the advice information in a case of driving the vehicle from a merging lane into a main lane.

9. The vehicle according to claim 8, wherein the advice information presentation unit presents the advice information including at least one of information related to accelerator operation, braking operation, steering wheel angle, or blinker operation in the case of driving the vehicle from the merging lane into the main lane.

10. The vehicle according to claim 1, wherein the advice information presentation unit presents the advice information in a case of driving the vehicle into a crossroads.

11. the vehicle according to claim 10, wherein the advice information presentation unit presents the advice information including at least one of information related to accelerator operation, braking operation, or blinker operation in the case of driving the vehicle into the crossroads.

12. The vehicle according to claim 1, wherein after the advice information is presented by the advice information presentation unit, the control device is configured to cause the advice information presentation unit to present information related to confirmation of whether to continue the presenting the advice information.

* * * * *

UNITED STATES PATENT AND TRADEMARK OFFICE
CERTIFICATE OF CORRECTION

PATENT NO. : 10,800,431 B2
APPLICATION NO. : 16/225579
DATED : October 13, 2020
INVENTOR(S) : Megumi Amano et al.

Page 1 of 2

It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

Item (72), inventor 2, city, delete "Nagakute" and insert --Nagakute-shi Aichi-ken--, therefor.

Item (72), inventor 3, city, delete "Toyota" and insert --Toyota-shi Aichi-ken--, therefor.

Item (72), inventor 4, city, delete "Nagoya" and insert --Nagoya-shi Aichi-ken--, therefor.

Item (72), inventor 5, city, delete "Toyota" and insert --Toyota-shi Aichi-ken--, therefor.

Item (72), inventor 6, city, delete "Nagoya" and insert --Nagoya-shi Aichi-ken--, therefor.

In the Specification

In Column 1, Line(s) 13, after "vehicle", delete "," and insert --.--, therefor.

In Column 1, Line(s) 23, after "position", delete ",".

In Column 2, Line(s) 41, after "including", delete ",".

In Column 3, Line(s) 28, delete ""driving operations", in" and insert --"driving operations". In--, therefor.

In Column 4, Line(s) 60, after "thereof", insert --,--.

In Column 5, Line(s) 35, after "can", delete "he" and insert --be--, therefor.

In Column 5, Line(s) 40, after "light", delete "," and insert --.--, therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,800,431 B2

In Column 5, Line(s) 55, delete "die" and insert --the--, therefor.

In Column 6, Line(s) 4, after "may", delete "he" and insert --be--, therefor.

In Column 7, Line(s) 30, after "PG", insert --,--.

In Column 7, Line(s) 35, after "driving", delete ",".

In Column 7, Line(s) 45, after "may", delete "he" and insert --be--, therefor.

In Column 8, Line(s) 11, after "processors", delete ",".

In Column 8, Line(s) 17 & 18, after "location-related", delete ",".

In the Claims

In Column 10, Line(s) 22, Claim 11, delete "the" and insert --The--, therefor.